(12) United States Patent
Yan

(10) Patent No.: US 7,134,167 B2
(45) Date of Patent: Nov. 14, 2006

(54) STRUCTURE OF A CONNECTING SHAFT MECHANISM OF A CASTER ASSEMBLY

(76) Inventor: Li-Lan Yan, No. 36-1, Siaokang Lang, Puzih City, Chiayi County (TW)

( * ) Notice: Subject to any disclaimer, the term of this patent is extended or adjusted under 35 U.S.C. 154(b) by 16 days.

(21) Appl. No.: 10/878,026

(22) Filed: Jun. 29, 2004

(65) Prior Publication Data

US 2005/0285441 A1    Dec. 29, 2005

(51) Int. Cl.
*B60B 33/00*   (2006.01)

(52) U.S. Cl. .......................................... 16/39; 16/31 A
(58) Field of Classification Search ................ 16/35 R, 16/37, 39, 43, 35 D, 47, 19, 38, 31 A; 188/1.12; 301/5.301, 111.07, 111.01
See application file for complete search history.

(56) References Cited

U.S. PATENT DOCUMENTS

| | | | | |
|---|---|---|---|---|
| 3,022,535 A | * | 2/1962 | Black | 16/37 |
| 3,988,800 A | * | 11/1976 | Sachser | 16/35 R |
| 4,414,702 A | * | 11/1983 | Neumann | 16/35 R |
| 4,677,706 A | * | 7/1987 | Screen | 16/35 R |
| 4,821,369 A | * | 4/1989 | Daniels | 16/35 R |
| 5,184,373 A | * | 2/1993 | Lange | 16/35 R |
| 5,242,035 A | * | 9/1993 | Lange | 188/1.12 |
| 6,584,641 B1 | * | 7/2003 | Milbredt | 16/35 R |

* cited by examiner

*Primary Examiner*—Jason R. Bellinger
(74) *Attorney, Agent, or Firm*—Rosenberg, Klein & Lee

(57) ABSTRACT

A caster includes a wheel, and a connecting shaft mechanism for holding the wheel in position; the shaft mechanism includes a sleeve consisting of two half parts, and a supporting shank member, which is held in the sleeve at an upper end, and with which the wheel is connected; the supporting shank member is formed with two flat portions, which face outwards in opposite directions; the sleeve half parts are connected together by means of bolts with inward sides thereof facing each other; each of the sleeve half parts has a flat portion on the inward side thereof; the flat portions of the sleeve half parts touch respective ones of the flat portions of the supporting shank member for preventing angular displacement of the supporting shank member relative to the sleeve.

2 Claims, 6 Drawing Sheets

STRUCTURE OF A CONNECTING SHAFT MECHANISM OF A CASTER ASSEMBLY

BACKGROUND OF THE INVENTION

1. Field of the invention

The present invention relates to a connecting shaft mechanism of a caster assembly, more particularly one, which is easy to manufacture and assemble, and which is structured such that various parts thereof are securely connected together.

2. Brief Description of the Prior Art

Casters that are used on trolleys and hospital beds, such as is shown in FIG. 7, usually include a wheel, an immobilizing mechanism for the wheel, a connecting shaft mechanism, by means of which the wheel is held in position, and a control mechanism usable for activating the immobilizing mechanism; both the immobilizing mechanism and the control mechanism are connected with the connecting shaft mechanism.

Referring to FIG. 5, a conventional connecting shaft mechanism of a caster assembly includes a connecting shank member 82, and a sleeve, which consists of two sleeve half parts 81, 81. The supporting shank member 82 has an axial hole, annular recesses 821, annular protrusions 822 adjacent to the annular recesses 821, and a radial through hole 823. The sleeve half parts 81 have fitting posts 811 and fitting cavities 812 on upper portions of inward flat sides thereof, radial through holes 814, holding recesses 813 on upper portions, lengthwise extending recesses 816 under and communicating with the holding recesses 813, inward semicircular protrusions 817 and semicircular recesses 818 at lower portions, and stopping protrusions 815 adjacent to uppermost portions of the holding recesses.

The sleeve half parts 81, 81 are coupled to become the sleeve with the fitting posts 811 being respectively fitted in the fitting cavities 812, and the supporting shank member 82 is connected with the sleeve with the annular protrusions 822 thereof being fitted in the semicircular recesses 818 of the sleeve half parts 81, and the annular recesses 821 thereof being fitted over the semicircular protrusions 817 of the sleeve half parts. And, a metallic ring 83 is tightly fitted around upper extensions of the coupled sleeve half parts 81, 81 for holding the same together. Furthermore, the radial through holes 814, 823 of the sleeve half parts 81 and the shank member 82 are aligned with each other, and pins are inserted into the radio through holes 814 and 823; thus, the sleeve half parts 81, 81 are more firmly held together, and the supporting shank member 82 can't be separated from or angularly displaced relative to the sleeve.

The control mechanism is connected with the sleeve with a turning element 84 thereof being held in both of the holding recesses 813 of the sleeve half parts, the angular displacement of which turning element 84 is limited by means of the stopping protrusions 815 of the sleeve half parts.

The connecting shaft mechanism has advantages as followings:

1. The pins are used to prevent angular displacement of the shank member relative to the sleeve half parts, therefore in assembly, the assembler has to move the shank member carefully to such a position that the radial through holes are aligned with corresponding through holes of the sleeve half parts for allowing insertion of the pins into the through holes. Consequently, the connecting shaft mechanism takes much labor and time to assemble.

2. Because the sleeve half parts have to be formed with upper extensions for connection with the metallic ring, which is used to hold the sleeve half parts together besides the pins, the sleeve half parts have increased length, and more materials have to be used in manufacturing them. Consequently, the material cost increases. And, there will be an additional step in assembling the connecting shaft mechanism.

3. The pins and the metallic ring need to be manufactured with their respective processes therefore there are too many steps in manufacturing the caster assembly. Consequently, the manufacturing cost of the whole caster assembly will increase significantly.

4. Because of the stopping protrusions of the sleeve half parts, which are used to limit the angular displacement of the turning element in the holding recesses, the sleeve half parts will be more difficult to manufacture.

Referring to FIG. 6, another conventional connecting shaft mechanism of a caster assembly includes upper and lower hollow supporting shanks 91 and 92, and a sleeve, which consists of two sleeve half parts 93, 93. The upper supporting shank 91 is held in an upper end of the lower supporting shank 92 at a lower end thereof, and has a holding room in an upper portion thereof, and two radial through holes, which oppose each other, on two sides of the holding room. The sleeve half parts 93 have holding recesses 931 on inward sides thereof, stopping protrusions 932 adjacent to uppermost portions of the holding recesses 931, and through holes communicating with the holding recesses, and they are coupled with the holding recesses 931 facing each other. A turning element 94 of a control mechanism is held in the holding recesses 931, and the sleeve is closely fitted in the holding room of the upper supporting shank 91, and a lever (not shown) of the control mechanism is connected with the turning element 94 after having been passed through the through holes of the sleeve half parts 93 and the upper supporting shank 91. Furthermore, an adjusting element of an immobilizing mechanism (not shown) is passed into both the lower and the upper supporting shanks 91 and 92 to be right under the turning element 94 of the control mechanism. And, the upper end of the upper supporting shank 91 is folded inwards by means of pressing rollers such that it is pressed against the sleeve half parts 93, 93. Consequently, the sleeve half parts 93 are firmly held in the holding room of the upper supporting shank 91.

The second connecting shaft mechanism has advantages as followings:

1. The upper supporting sank has be formed with the radial through holes for allowing the lever to be connected with the turning element held in the sleeve, and in assembly, the assembler has to position the sleeve carefully such that the through holes of the sleeve half parts are aligned with the radial through holes of the. Therefore, the connecting shaft mechanism takes more labor and time to assemble.

2. The upper supporting shank will be reduced in the length after the upper end thereof is inwards folded onto the top of the sleeve by means of pressing rollers. Therefore, the pressing process has to be carefully performed otherwise the upper supporting shank can't be formed with proper length. Furthermore, owing to the pressing process with rollers, the connecting shaft mechanism will be more difficult to manufacture no matter which one of both the sleeve and the immobilizing mechanism is connected with the upper supporting shank first.

3. The pressing process with rollers isn't relatively easy, and in turns, it will cause increase to the cost and time needed to manufacture the caster assembly.

4. The sleeve half parts also have to be formed with the stopping protrusions, which are used to limit the angular displacement of the turning element held in the holding recesses. Therefore, the sleeve half parts are as difficult to manufacture as those of the first conventional shaft mechanism.

SUMMARY

It is a main object of the present invention to provide an improvement on a connecting shaft mechanism of a caster assembly to overcome the above disadvantages.

The connecting shaft mechanism of the present invention includes a sleeve consisting of two half parts, and a supporting shank member, which is held in the sleeve at an upper end, and with which the wheel is connected. The supporting shank member is formed with two flat portions, which face outwards in opposite directions. The sleeve half parts are connected together by means of bolts with inward sides thereof facing each other; each of the sleeve half parts has a flat portion on the inward side thereof. The flat portions of the sleeve half parts touch respective ones of the flat portions of the supporting shank member for preventing angular displacement of the supporting shank member relative to the sleeve.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
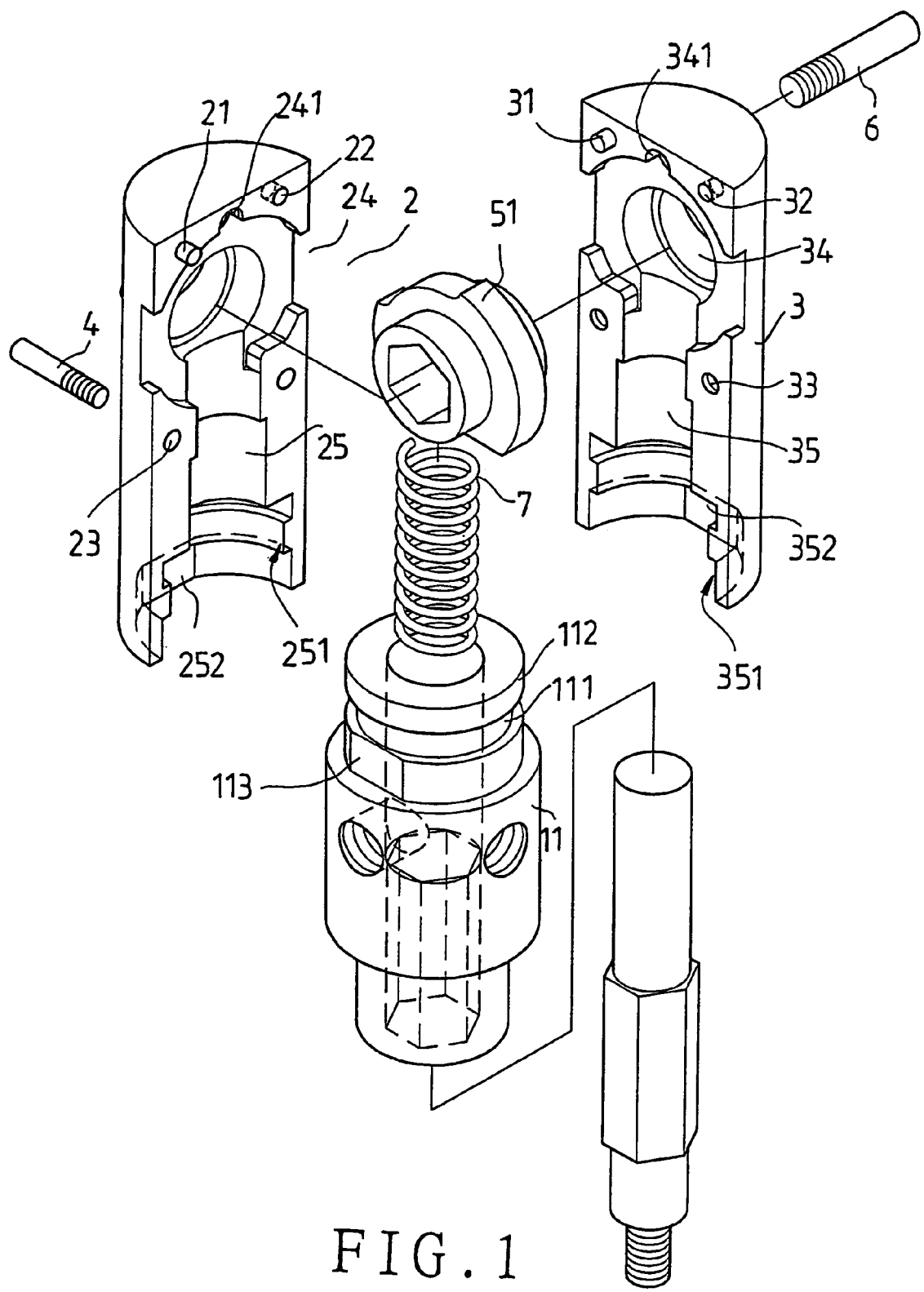
FIG. 1 is an exploded perspective view of the connecting shaft of a caster assembly according to the present invention.
Figure 2:
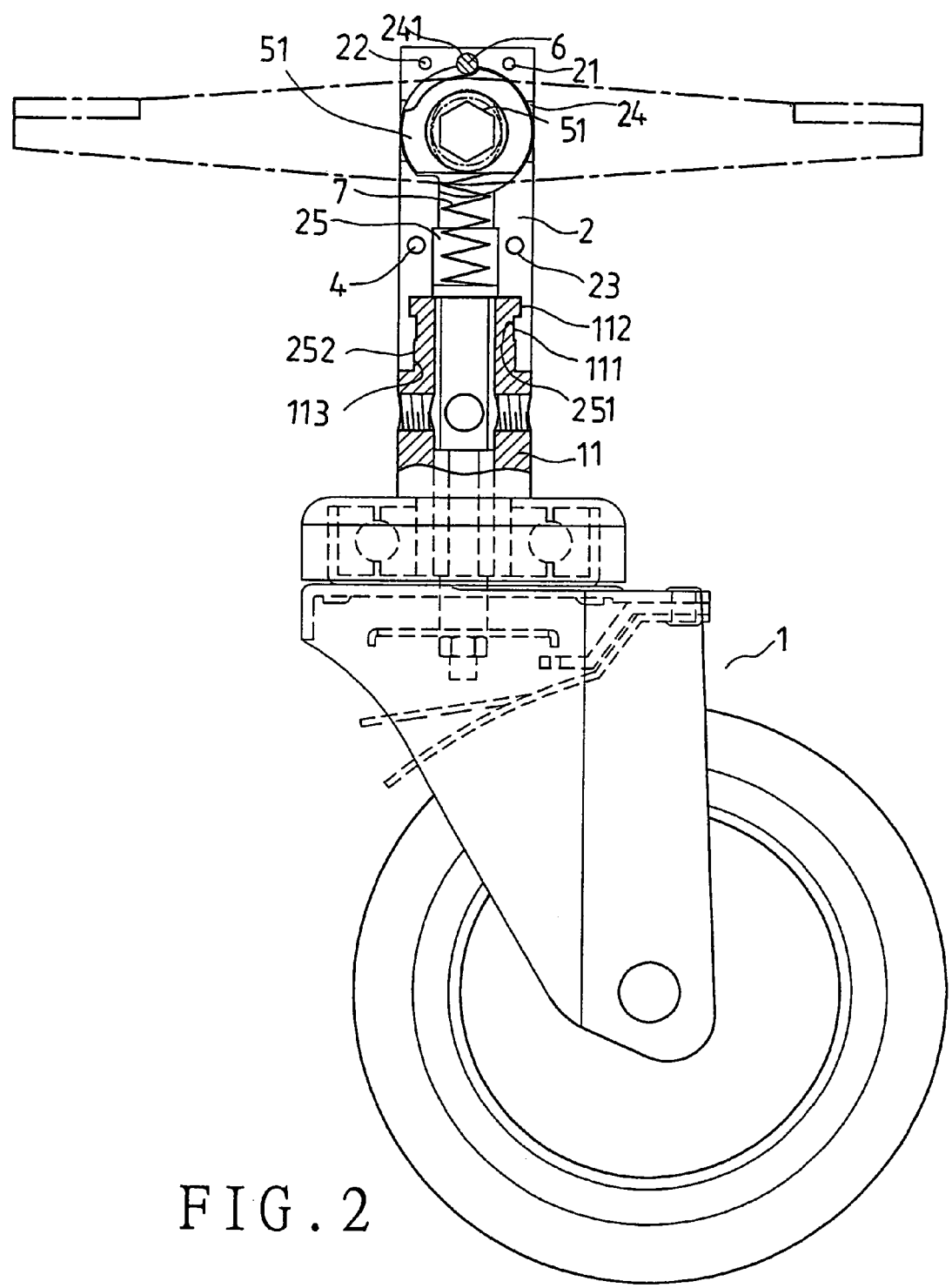
FIG. 2 is a vertical section of the connecting shaft of a caster assembly according to the present invention.
Figure 4:
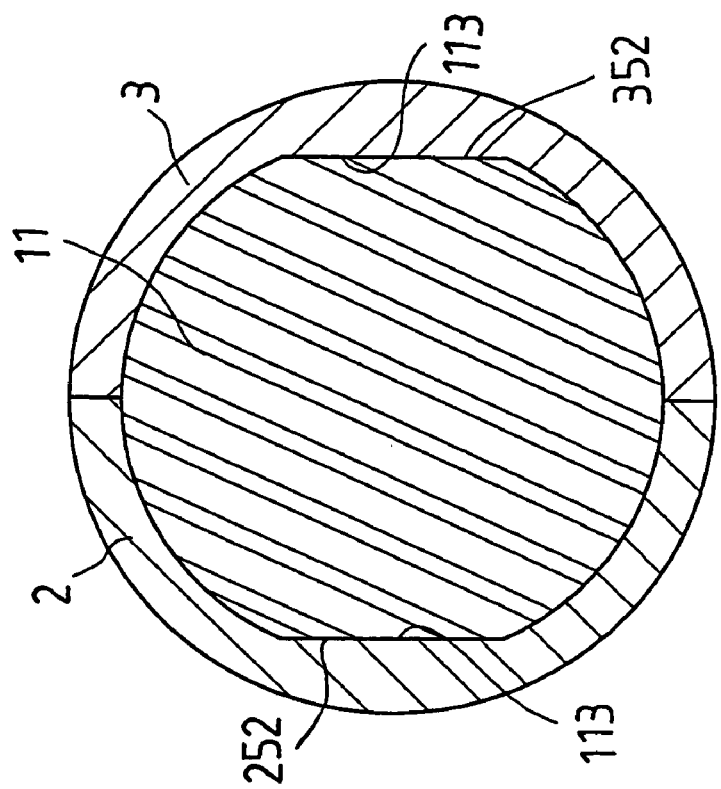
FIG. 4 is another horizontal section of the connecting shaft of a caster assembly according to the-present invention.
Figure 3:
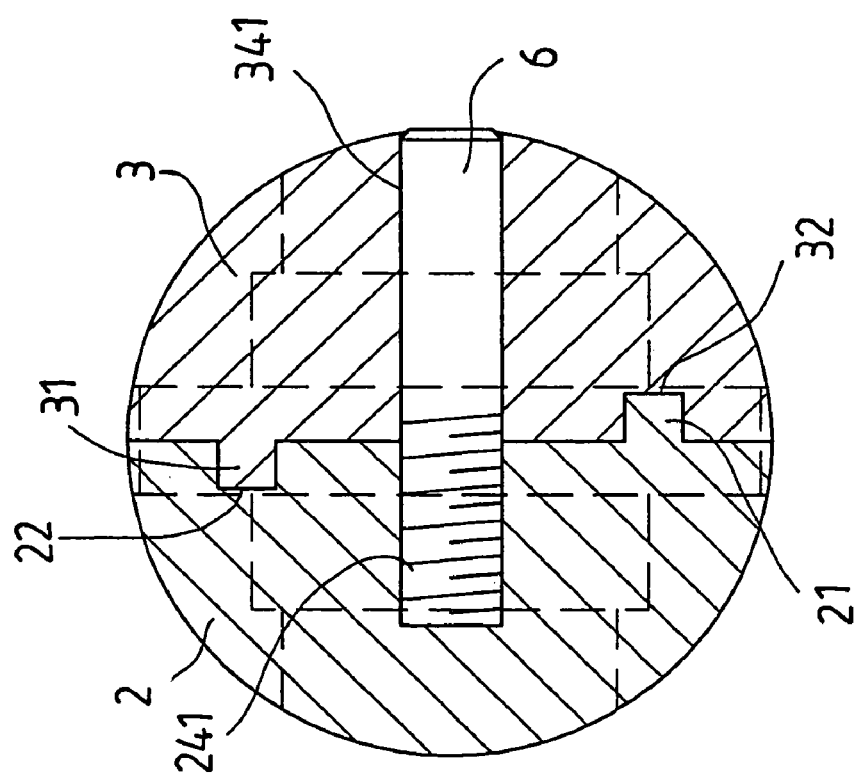
FIG. 3 is a horizontal section of the connecting shaft of a caster assembly according to the present invention.
Figure 5:
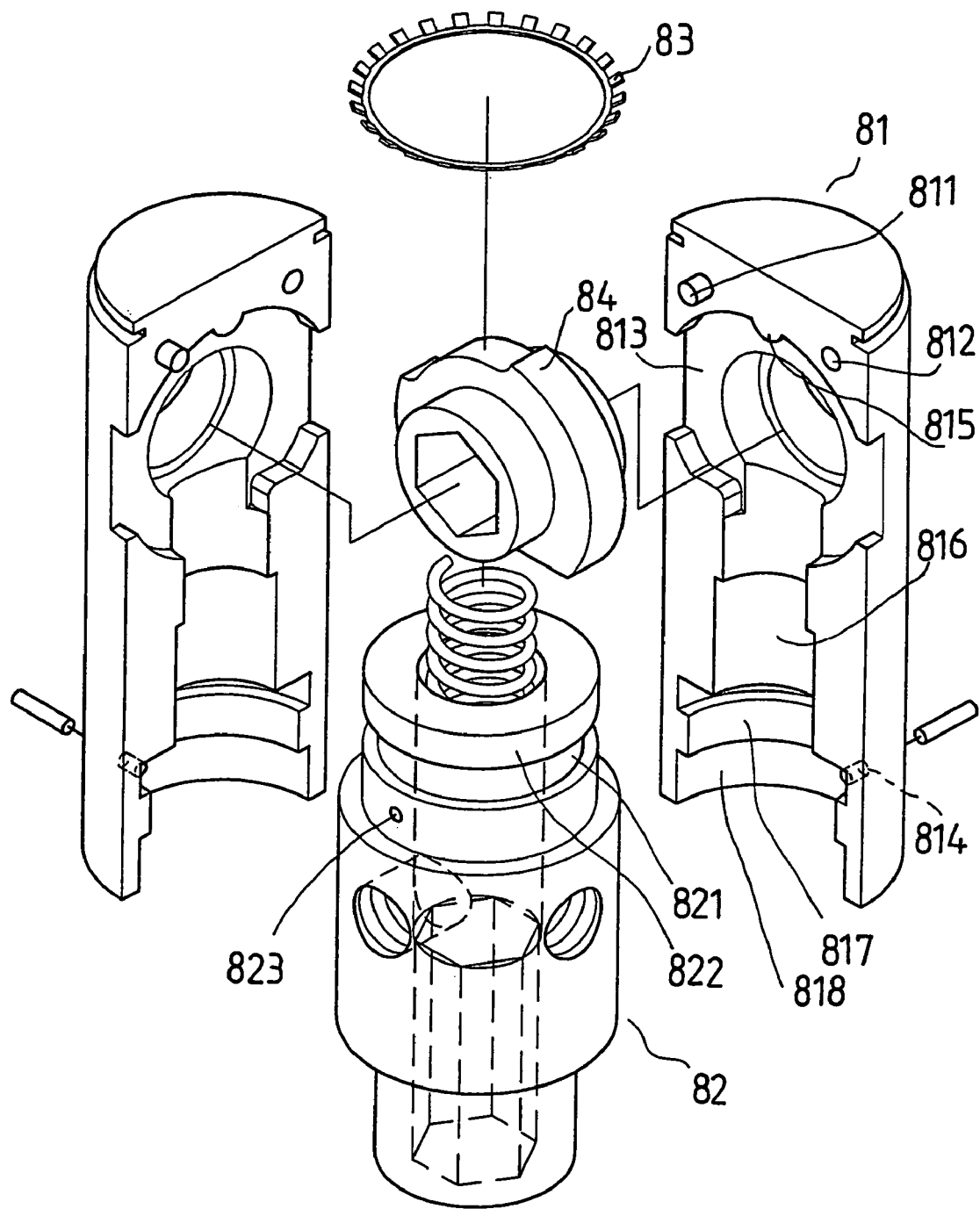
FIG. 5 is an exploded perspective view of the first conventional connecting shaft of a caster assembly.
Figure 6:
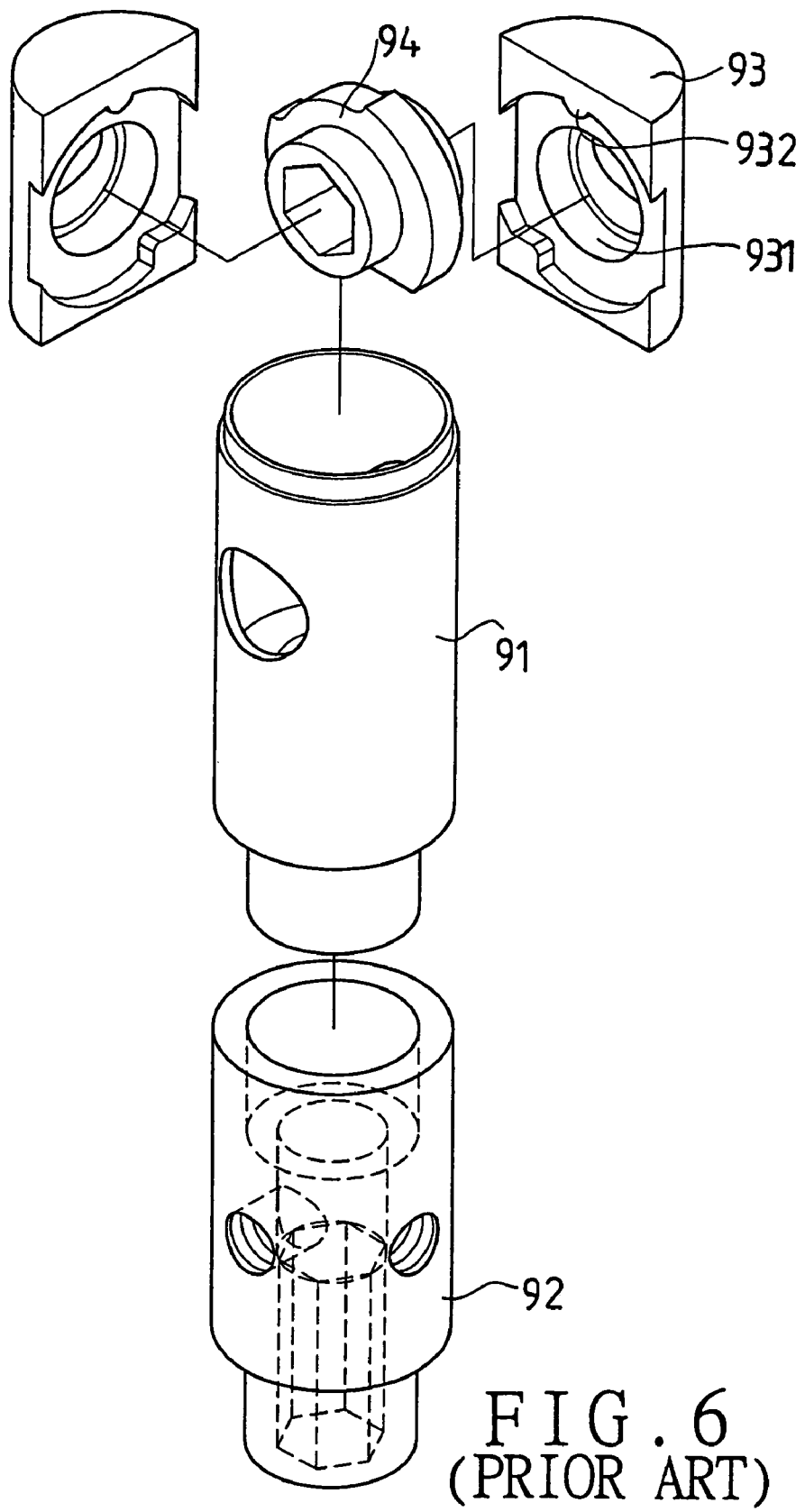
FIG. 6 is an exploded perspective view of the second conventional connecting shaft of a caster assembly.
Figure 7:
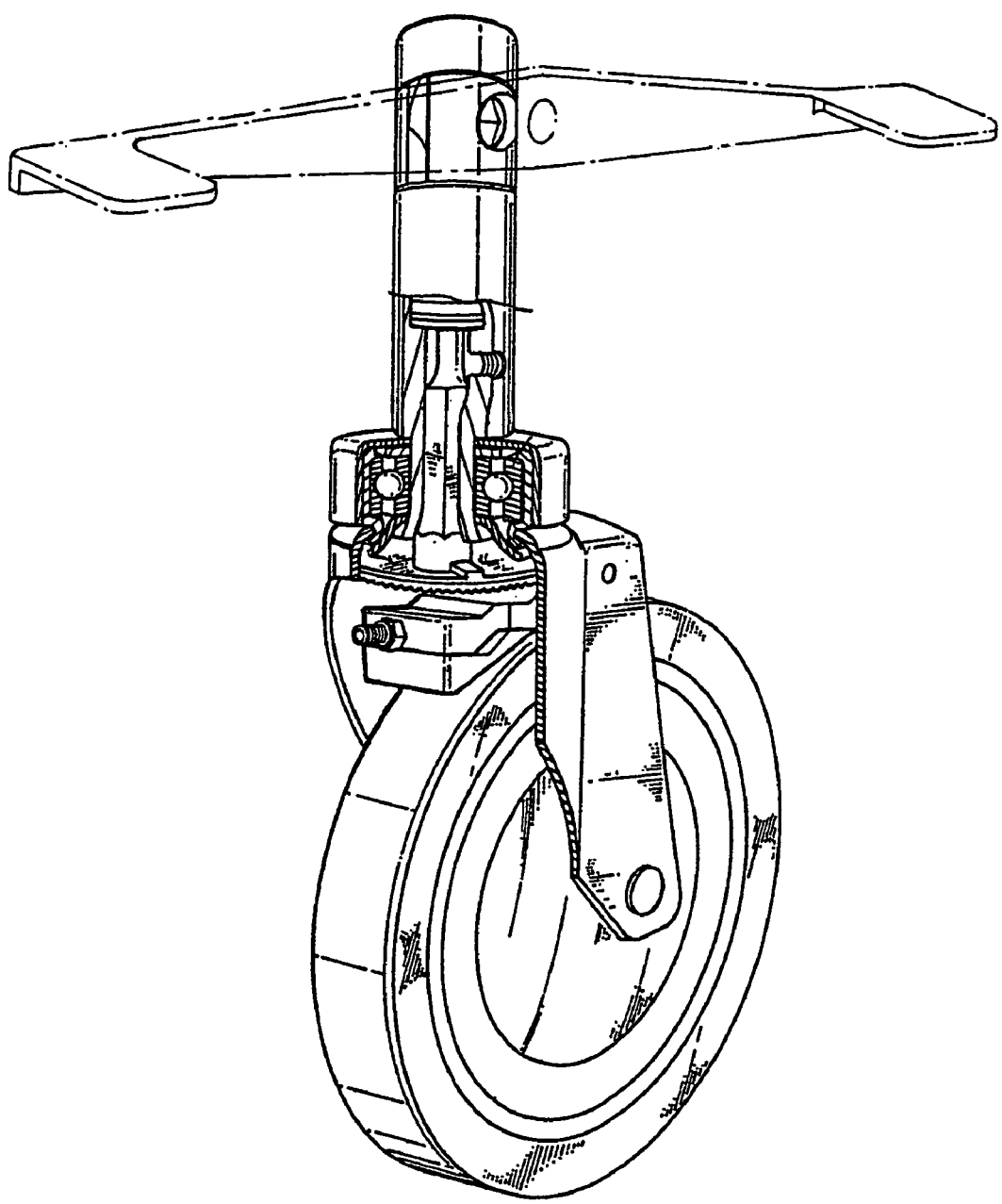
FIG. 7 is a perspective view of a conventional caster assembly.

Referring to FIGS. 1 to 4, a preferred embodiment of a caster assembly includes a wheel 1, an immobilizing mechanism, a control mechanism, which includes both a lever 5 and a turning element 51, and a connecting shaft mechanism, which is the subject matter in the present invention, and which includes both a supporting shank member 11 and a cylindrical sleeve consisting of two sleeve haft parts 2 and 3.

The immobilizing mechanism is used for immobilizing the wheel 1, and includes an adjusting unit 7, but it is not the subject of the present invention, therefore it won't be detailed herein.

The supporting shank member 11 has an axial through hole, an annular recess 111, an annular protrusion 112 right above the annular recess 111, and two flat portions 113, which face outwards in opposite directions.

The sleeve half part 2 has a fitting post 21 and a fitting cavity 22 on an upper end of an inward flat side thereof, first screw holes 23 extending from a curved side to the flat side, a holding recess 24 on the flat side, a through hole formed on the curved side to communicate with the holding recess 24, a second screw hole 241 extending from the curved side to the flat side and adjacent to an uppermost portion of the holding recess 24, a lengthwise extending recess 25 under and communicating with the holding recess 24, an inward semicircular protrusion 251 and an inward semicircular recess at a lower portion, and an inward flat portion 252 under the inward semicircular protrusion 251.

The sleeve half part 3 is substantially the same as the sleeve half part 2, having a fitting post 31, a fitting cavity 32, first screw holes 33, a holding recess 34, a hole formed on the curved side to communicate with the holding recess 34, a second screw hole 341, a lengthwise extending recess 35, an inward semicircular protrusion 351 and an inward semicircular recess, and an inward flat portion 352.

The sleeve half parts 2 and 3 of the sleeve are connected together with the fitting posts 21, 31 being respectively fitted in the fitting cavities 32, 22, the first screw holes 23 being aligned with respective ones of the first screw holes 33, and with the semicircular protrusions 351 being connected together to form an annular protrusion, and the semicircular recesses being connected together to form an annular recess; first bolts 4, 4 are screwed into the first screw holes 23 and 33, and a second bolt 6 is screwed into the second screw holes 241 and 341 such that the sleeve half parts 2 and 3 are securely connected together. And, the control mechanism is connected with the sleeve with the turning element 51 thereof being held in the holding recesses 24 and 34. The lever 5 of the control mechanism is passed through the through holes of the sleeve half parts 2 and 3, and connected with the turning element 51; thus, the turning element 51 can be angularly displaced relative to the sleeve half parts 2, 3 when the lever 5 is operated, and the range of angular displacement of the turning element 51 will be limited by means of the second bolt 6.

The supporting shank member 11 is connected with the sleeve with the annular protrusion 112 being fitted in the annular recess of the sleeve, the annular recess 111 being fitted over the annular protrusion of the sleeve, and with the outwards facing flat portions 113 touching the flat portions 252 and 352 of the sleeve; thus, the supporting shank member 11 can't be separated from or angularly displaced relative to the sleeve.

The adjusting unit 7 of the immobilizing mechanism is held in an upper end of the axial through hole of the supporting shank member 11, and comes into contact with the turning element 51 at an upper end thereof. And, the wheel 1 is fitted in position under the supporting shank member 11 of the connecting shaft mechanism. Thus, when the lever 5 of the control mechanism is pivoted to a sloping position, the turning element 51 will depress the upper end of the adjusting unit 7; because the main purpose of the present invention is to provide a connecting shaft mechanism that is easy to manufacture and assemble, and because both the immobilizing mechanism (including the adjusting unit 7) and the control mechanism are not the subject matter in the present invention, the structure and function of the immobilizing mechanism and the control mechanism won't be described herein.

Furthermore, in assembling the connecting shaft mechanism, the second bolt 6 can be first screwed into one of the sleeve half parts 2, 3 before the sleeve half parts 2, 3 are coupled.

From the above description, it can be understood that the present connecting shaft mechanism of a caster assembly has the following advantages:

1. Because bolts are used as the means for securing the sleeve half parts 2 and 3 together, the connecting shaft mechanism is easy to assemble, and in turns, manufacturing cost reduces.
2. Owing to the flat portions 113 of the shank member 11, and the flat portions 252, 352 of the sleeve half parts 2 and 3, angular displacement of the shank member 11 relative to the sleeve half parts 2 and 3 are prevented and with ease. Consequently, the disadvantage of the conventional connecting sleeve mechanism is overcome; in order to prevent angular displacement of the shank member relative to the sleeve half parts, pins have to be inserted into the through holes of the sleeve half parts and corresponding radial through holes on the shank member, therefore in assembly, the assembler has to move the shank member carefully to such a position that the radial through holes are aligned with corresponding through holes of the sleeve half parts for allowing insertion of pins into the through holes.
3. Because the bolt 6 is screwed into the second screw holes 241 and 341 adjacent to the uppermost portion of the holding recesses 24 and 34, it can be used to limit the range of angular displacement of the turning element 51. Consequently, the sleeve half parts 2 and 3 don't have to be formed with limiting protrusions adjacent to the holding recesses 24, 34, and they will be easier to manufacture than the conventional sleeve half parts as described in Background.

What is claimed is:

1. A connecting shaft mechanism of a caster assembly, comprising:

a supporting shank member, with which a wheel of the caster assembly is connected; the supporting shank member being formed with two flat portions, which face outwards in opposite directions;

a sleeve fitted around an upper end of the supporting shank member at a lower end; the sleeve consisting of two coupled sleeve half parts; the sleeve half parts being connected together with inward sides thereof facing each other and formed with a first recess at an upper portion of the inward side, and a lengthwise extending recess, which communicates with the first recess, at a lower portion of the inward side; the first recesses opposing each other, and the lengthwise extending recesses opposing each other when the sleeve half parts are coupled together; each of the sleeve half parts further having a flat portion on the inward side thereof; the flat portions of the sleeve half parts touching respective ones of the flat portions of the supporting shank member for preventing angular displacement of the supporting shank member relative to the sleeve, said sleeve half parts having a plurality of first screw holes and aligned second screw holes, said second screw holes being located at upper ends of each of said sleeve half parts and further being adjacent to edges of the first recesses of each of said sleeve half parts;

a corresponding bolt for said second screw holes, said corresponding bolt being screwed into said second screw holes for limiting the rotational movement of a turning element;

a control mechanism of the caster assembly being connected with the sleeve half parts with said turning element thereof being held in the first recesses; and an immobilizing mechanism of the caster assembly being connected with the sleeve half parts with an adjusting element thereof being held in the lengthwise extending recesses.

2. The connecting shaft mechanism as claimed in claim 1, wherein the plurality of first screw holes extend from curved sides to the inward sides of said sleeve half parts; the first screw holes of one of the sleeve half parts being aligned with corresponding screw holes of the respective other sleeve half parts when the sleeve half parts are coupled each to the other; and bolts being screwed into the first screw holes to secure the sleeve half parts each to the other.

* * * * *